United States Patent [19]

Peruth et al.

[11] Patent Number: 4,564,820

[45] Date of Patent: Jan. 14, 1986

[54] BLOCKING OSCILLATOR CONVERTER WITH CONTROLLING LOGIC SYSTEM

[75] Inventors: Günther Peruth; Michael Lenz, both of Munich, Fed. Rep. of Germany

[73] Assignee: Siemens Aktiengesellschaft, Berlin & Munich, Fed. Rep. of Germany

[21] Appl. No.: 653,541

[22] Filed: Sep. 24, 1984

[30] Foreign Application Priority Data

Nov. 7, 1983 [DE] Fed. Rep. of Germany ....... 3340138

[51] Int. Cl.[4] .................... H02M 3/335; H02H 7/122
[52] U.S. Cl. ..................................... 331/62; 331/112; 363/21; 363/56; 363/97
[58] Field of Search .................... 331/62, 65, 66, 112, 331/113 A; 363/19, 21, 23, 25, 26, 56, 95, 97; 361/74, 75

[56] References Cited

U.S. PATENT DOCUMENTS

4,288,831 9/1981 Dolikian ........................... 363/26 X
4,494,178 1/1985 Ishima ............................. 363/26 X

FOREIGN PATENT DOCUMENTS

3032034 3/1982 Fed. Rep. of Germany .

OTHER PUBLICATIONS

"Combinational Logic System Parts", by Wustehube, 1977, VDE Publisher, pp. 87–139.
"Funkschau" (1975), vol. 5, pp. 40–43.

Primary Examiner—Siegfried H. Grimm
Attorney, Agent, or Firm—Hill, Van Santen, Steadman & Simpson

[57] ABSTRACT

A blocking oscillator converter with controlling logic system has an oscillator which, in the active state, blocks control of a switching transistor of the converter, and hence feeding of the electronic apparatus to be supplied by the converter. The oscillator blocks the output of a control circuit in the active state and, in the passive state, has no influence on the control of the switching transistor by the control circuit. The active state of the oscillator is triggered by monitoring of the possible operational errors by an error indicator when such an operational error occurs. After decay of the operational error has taken place, the oscillator again returns to the passive state. The advantage of the blocking oscillator converter with controlling logic system is primarily provided through a considerable reduction of the power dissipation in the blocking oscillator converter, and primarily in its switching transistor during error indications.

9 Claims, 7 Drawing Figures

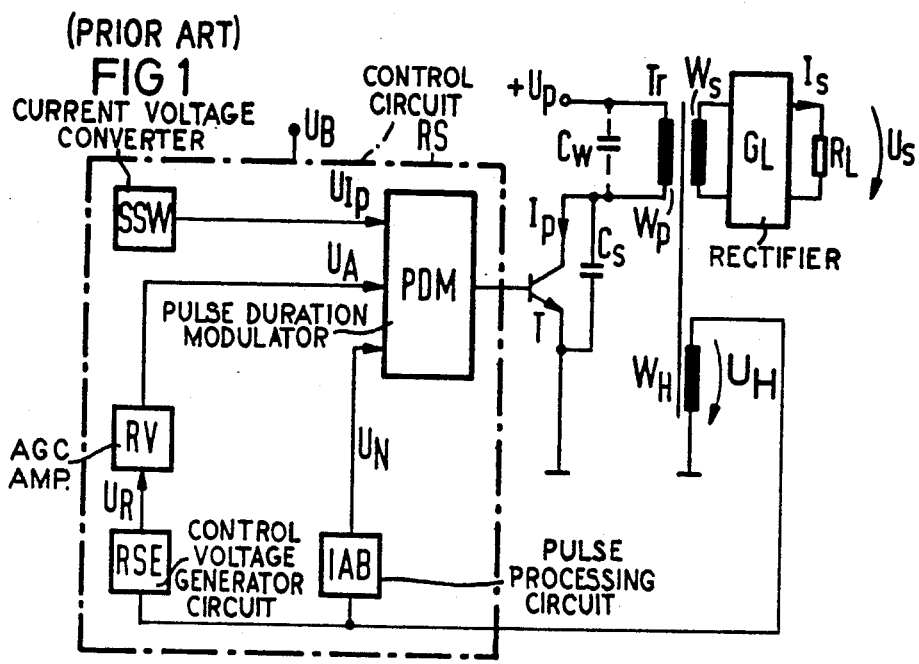
(PRIOR ART) FIG 1
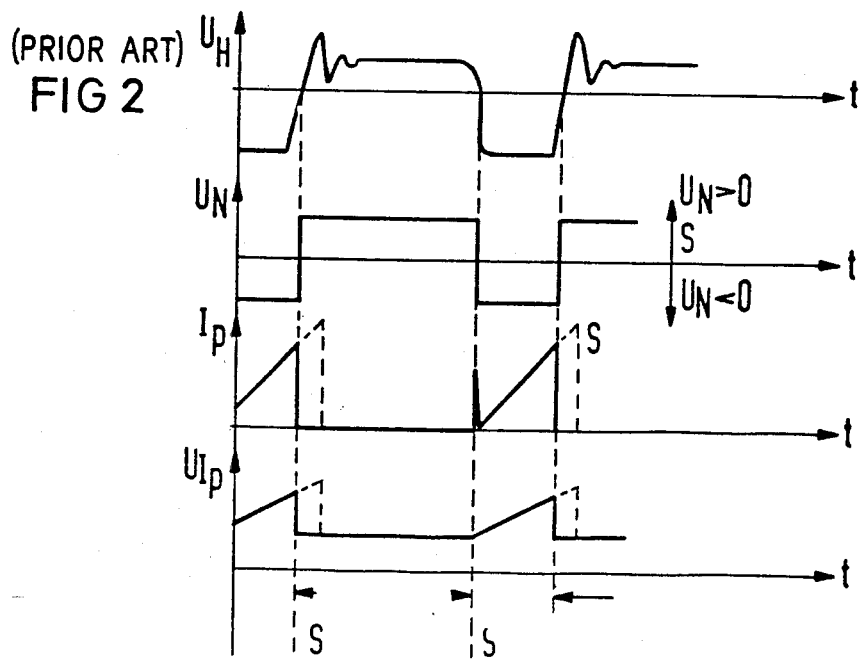
(PRIOR ART) FIG 2

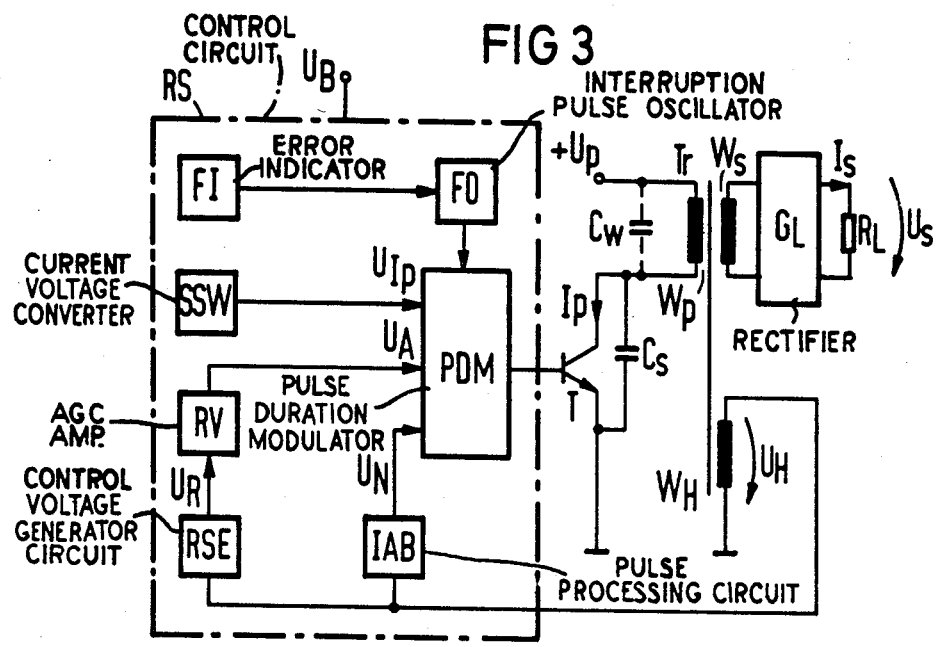
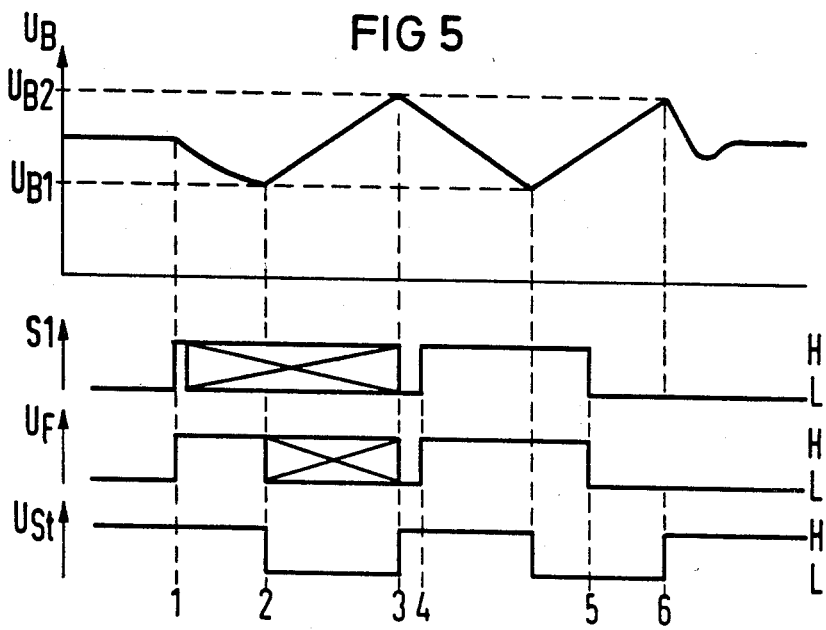

BLOCKING OSCILLATOR CONVERTER WITH CONTROLLING LOGIC SYSTEM

BACKGROUND OF THE INVENTION

The present invention relates to a blocking oscillator converter with controlling logic system for the supply of an electrical apparatus. A primary winding of a transformer is connected in series with the path of a switching transistor to carry the current to be switched.

A D.C. voltage is obtained through rectification of the mains A.C. voltage supplied via two external supply connections. A secondary winding of the transformer is provided for the purpose of current supply of the electrical apparatus. A control electrode of the switching transistor is controlled by an output of a control circuit which is controlled by the rectified A.C. voltage as the actual value and by a nominal value circuit.

In the logic system, a starting circuit is provided for further control of the control electrode of the switching transistor. The control circuit is constructed such that its current supply is provided by means of a secondary winding of the transformer which contains a circuit serving the purpose of generating a control voltage. The circuit comprises an AGC amplifier and a circuit for pulse processing. Both the output of the control amplifier as well as the output of the pulse processing system is connected to one input of a pulse-duration modulator connected to the control electrode of the switching transistor and forming the output of the control circuit. A third input of the pulse duration modulator is connected with a current-voltage converter.

Such a blocking oscillator converter with controlling logic system is described in German No. OS 30 32 034, incorporated herein by reference. As further prior art, see "Funkschau" (1975), volume 5, pages 40–43; the book of Wuestehube titled "Combinatorial Logic System Parts" appeared in 1977—VDE publisher—see for example page 87–139; and Siemens "Combinatorial Logic System Part With the IS TDA 4600", page 7 and following, all incorporated herein by reference.

As is known, such a logic system has the task of supplying an electrical apparatus e.g. a television receiver, with stabilized and controlled operating voltages. The heart of such a logic system is therefore a control circuit whose final control element is a switching transistor such as a bipolar power transistor. In addition, a high operating frequency and a transformer adjusted to a high operating frequency is provided since generally an extensive isolation of the electrical apparatus which is to be supplied from the supply network is desirable. Such logic systems can be designed either according to synchronized operation or according to self-oscillating operation. The latter type of operation applies to a logic system with which the present invention is concerned and such as is also described in the German No. OS 30 32 034, incorporated herein by reference.

The basic circuit diagram corresponding to such a logic system is illustrated in FIG. 1, which is first discussed hereafter.

A npn-power transistor T serves as the final control element for the control circuit and, with its emitter collector path, is connected in series with the primary winding $W_p$ of a transformer Tr. With reference to FIG. 1 of the German No. OS 30 32 034, it can be determined that the DC voltage $U_p$, serving for the operation of such a series connection, is obtained by means of a rectifier circuit operated by the AC mains, for example, a Gratz (full-wave) rectifier circuit system. In the case of the use of an npn-transistor T, its emitter is connected to reference potential (ground), the collector is connected to the primary winding $W_p$ of the transformer Tr, and the other end of the primary winding is connected to the supply potential $U_p$ delivered by the above-described (but not illustrated in the drawing) rectifier circuit. The emittercollector path of the switching transistor T is bridged by a capacitor $C_s$. The capacitance $C_w$ illustrated in FIG. 1 and connected to the primary winding $W_p$, by contrast, is of a parasitic nature. The switching transistor T is controlled at its base by the output portion of the control circuit RS, i.e., in the case of the embodiment according to FIG. 1, by a pulse duration modulator PDM.

An auxiliary winding $W_H$ of the transformer Tr serves as a sensor for the control circuit RS and is therefore connected, at one end, to the reference potential and, at the other end, to the input of the control circuit RS. An additional winding $W_s$ forms the actual secondary side of the transformer Tr. It serves the purpose of supplying a rectifier system GL whose output is provided for the supply of the electric apparatus $R_L$ by means of a DC voltage $U_s$.

In the preferred embodiment of a blocking oscillator converter with a controlling logic system illustrated in FIG. 1, the control circuit RS, in addition to the already cited output circuit PDM designed in the form of a pulse duration modulator, contains two input circuits controlled by the auxiliary winding $W_H$. The one input circuit RSE serves the purpose of control voltage generation and, via an AGC amplifier RV, releases a control signal $U_A$ for the output circuit PDM. The other input circuit IAB serves the purpose of pulse processing and delivers a signal $U_N$ to the output circuit PDM of the control circuit RS. Finally, a current-voltage converter SSW is provided which forms the actual value control of the control circuit and releases a voltage $U_{Ip}$ proportional to the primary current $I_P$ to the pulse duration modulator PDM.

The last-cited portions of the control circuits RS are likewise disclosed in German No. OS 30 32 034, incorporated herein by reference. They correspond to the control circuit illustrated therein in FIG. 3. The control voltage generation RSE is provided by the resistances R5 and R4 apparent from FIGS. 1 and 2. The pulse processor IAB consists of the zero-axis crossing identification apparent in FIG. 3 of the German OS and of the control logic connected to it. Finally, the pulse duration modulator PDM is provided by the trigger circuit indicated in German No. OS 30 32 034 with the portion of the control logic connecting to drive it.

Connected to an additional terminal of the control circuit RS is the operating voltage $U_B$ which serves the purpose of supplying the control circuit RS and through which the reference potential (ground) and the supply potential connected to the cited terminal is provided.

The time diagram corresponding to a circuit according to FIG. 1 present herein, i.e. the chronological behavior of the signals $U_H$ occurring in the control circuit RS (=the signal released by the transformer auxiliary winding $W_H$ for the control of the control circuit RS, $U_N$ (=the signal delivered by the pulse processing IAB), $I_p$ (=the current delivered by the transformer winding $W_p$ connected in series with the switching transistor T, and $U_{Ip}$ (=the actual value signal delivered by the current voltage converter SSW), is illustrated in FIG. 2.

As is apparent, the voltage $U_H$, delivered by the transformer winding $W_H$, with the zero-axis crossing ($U_H=0$ V), delivers the information that the energy stored in the transformer Tr has flowed off and that a new loading cycle can commence - i.e. the switch provided by the transistor T can be closed. Via the pulse processing stage IAB this information is communicated to the pulse duration modulator PDM. The following applies: $U_N<0$ V→pulse start, $U_N>0$ V→no pulse start possible.

In addition, one obtains from the auxiliary voltage $U_H$, delivered by the auxiliary winding $W_H$ of the transformer Tr with the aid of the control voltage generator RSE, a control voltage $U_R$ which is proportional to the secondary voltage $U_S$. In the AGC amplifier RV the control voltage is compared with a reference (=nominal value). The difference between the control voltage $U_R$ and the reference (=deviation) is amplified by the AGC amplifier RV and the signal voltage $U_A$ at its output is communicated to the pulse duration modulator PDM which compares it with the signal $U_{Ip}$ of the current voltage converter SSW and opens the switch provided by the transistor T as soon as $U_{Ip} \geq U_A$. In this manner, the peak value $I_{pmax}$ of $I_p$ is corrected until the difference between $U_R$ and the reference voltage disappears. This signifies that $U_R$, and hence $U_S$, remain constant.

If, in the case of a blocking oscillator converter with controlling logic system of the described type, and more generally the initially defined type, an error occurs in the control voltage generator RSE or in the voltage supply of the control circuit RS, the result is that the voltage $U_p$ assumes impermissably high values. This can lead to a corresponding excess increase of the secondary voltage $U_S$ and hence possibly to destructions in the electrical apparatus $R_L$ loaded by the logic system. In order to provide a remedy in this case, in the patent application No. P 33 36 422.2, incorporated herein by reference, a design of a blocking oscillator converter with controlling logic system corresponding to the previously provided description is proposed in which additionally an interference elimination circuit, which is inactive in the case of proper operation of the control circuit RS, is provided which, in turn, is connected to a secondary winding of the transformer Tr e.g. by the auxiliary winding $W_H$. It is designed such that, spontaneously with exceeding of a provided limit value by the current arising in the secondary winding, it disconnects the current commonly flowing via the switching transistor T on the primary winding $W_p$. A favorable embodiment of such an interference elimination circuit is also described in greater detail therein.

In the case of this interference elimination circuit, the activation of the switching transistor T by the output of the control circuit RS due to the action of the activated interference elimination circuit is blocked. This occurs until the influence of the interference behavior activating the interference elimination circuit and e.g. brought about by a faulty function in the control circuit, has died down again or has been compensated in another manner. Then a cancellation of the blocking and hence the activation of the control of the switching transistor T by the control circuit RS again automatically takes place.

In the case of such a solution to the cited problem, the effect is that the individual control pulses for the switching transistor T are suppressed. However, this frequently leads to the result that the power dissipation, primarily in the switching transistor T, can become very great. Therefore, a solution to the above-described problem is desired to the extent that the power dissipation in the blocking oscillator converter with controlling logic system is substantially reduced. The present invention is concerned with this objective.

SUMMARY OF THE INVENTION

In accordance with the present invention, for this purpose a controlling logic system for a blocking oscillator converter corresponding to the definition initially provided is designed in such a fashion that the output circuit PDM controlling the switching transistor T of the control circuit RS is additionally influenced by an oscillator emitting in its active state periodic pulses to the output circuit. Through each of these interruption pulses, a blockade of the normal control of the switching transistor T by the control circuit RS takes place and thus an activation of the oscillator by the individual operating parameters of the combinational logic system. This signifies a danger to the logic system part upon deviation from its normal behavior. During the normal behavior of these parameters, an influencing of the switching transistor T by the oscillator is suppressed. Finally the interruption pulses emitted by the oscillator in its active state to the output part PDM of the control circuit RS, as well as the frequency of the interruption pulses, are matched to the chronological behavior of the control circuit RS such that, after these interruption pulses, a reactivation of the control of the switching transistor T by the control circuit RS, which functions in a normal fashion, takes place.

An embodiment of the blocking oscillator converter controlling logic system corresponding to the invention prevents the blocking oscillator from oscillating at its normal frequency when an error is present. This is apparent from FIG. 2, exhibiting chronological behavior of an oscillator, wherein the oscillator is prevented from further oscillating with its high frequency, e.g. 30 kHz, as soon as the oscillator additionally provided in accordance with the invention and emitting interruption pulses, is activated. Instead, just this additional oscillator oscillating with a markedly lower frequency will modulate the influence of the control circuit, which otherwise operates in normal fashion as long as any one of the faulty functions provided for the activation of the additional oscillator (namely, via a common error indicator) is active. This is indicated by the error indicator. This modulation causes a normal start-up of the logic system operation to be automatically commenced immediately after the decay of each interruption pulse. This normal operating sequence, however in the case of the presence of an interference, is automatically again interrupted or entirely suppressed. However, the additional oscillator continues to oscillate and, after the decay of the next interruption pulse, automatically starts the next interrogation cycle, i.e. the renewed reactivation of the control circuit RS.

BRIEF DESCRIPTION OF THE DRAWINGS

FIG. 1 is a diagram showing operation of a known blocking oscillator converter;

FIG. 2 illustrates waveforms associated with the converter of FIG. 1;

FIG. 3 is a diagram illustrating a blocking oscillator converter having a controlling logic system according to the invention;

FIG. 5 illustrates waveforms to aid in understanding the system of FIG. 4.

DESCRIPTION OF THE PREFERRED EMBODIMENTS

Figure 4:
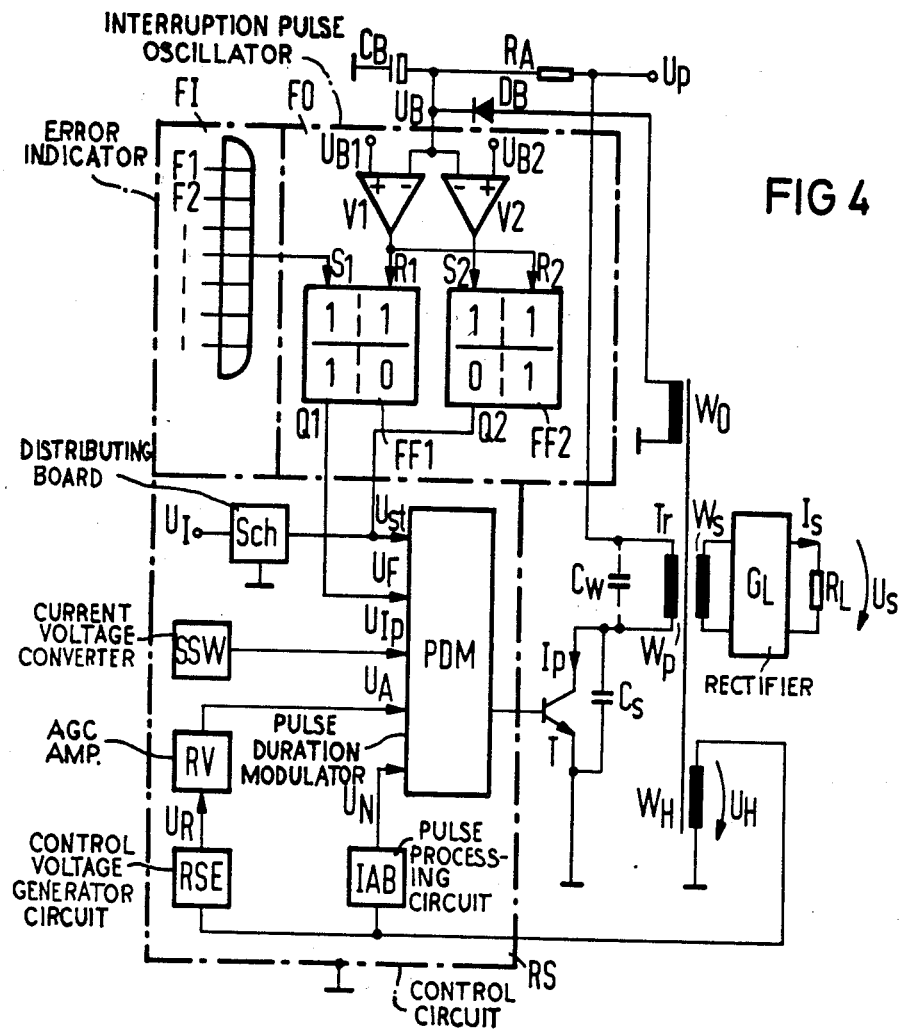
FIG. 4 is an expanded circuit diagram of the system shown in FIG. 3.

A block circuit diagram of the circuit designed in accordance with the invention for a blocking oscillator converter with controlling logic system is illustrated in FIG. 3. There, a preferred embodiment of the additional oscillator is shown in accordance with the invention. Its connection to error sources is illustrated in FIG. 4. A supplementation of the time diagram according to FIG. 2 is illustrated in FIG. 5.

As is apparent from FIG. 3, the circuit according to FIG. 1 for a blocking oscillator converter with controlling logic system is supplemented by a circuit FO delivering the cited interruption pulses. This circuit is in turn activated by an error indicator circuit FI. The already cited error indicator responds to the various error possibilities which can lead to danger to the logic system parts or to the following load circuit $R_L$ supplied by it.

An expedient and favorable embodiment of these two circuit parts is shown in FIG. 4. In this embodiment, in principle many random error functions can be effectively introduced via the error indicator FI for the activation of the oscillator circuit FO since a sensor, monitoring the respective error function, is employed for the control error indicator FI, and hence for the activation of the oscillator FO. Thus, the error functions activating the oscillator circuit can be executed without hysteresis, since the oscillator circuit part FO, in the triggered state, oscillates for at least one period.

The error indicator FI can comprise a variety of protective functions, such as e.g. the exceeding of a provided maximum value, falling below a specified minimum value for the secondary voltage $U_s$ at the input of the electronic system $R_L$ to be supplied by the logic system, for the primary voltage $U_p$, for the operating voltage $U_B$, or upon occurrence of excess temperatures in the circuit.

This takes place in simple fashion since, as is apparent from FIG. 4, the error indicator FI is designed in the form of an OR-circuit whose individual inputs F1, F2, . . . are controlled by one comparator, respectively. This in turn compares the voltage delivered by a sensor, respectively monitoring the error source F1 and F2, respectively, etc. corresponding to the respective input. The comparison of this voltage is with a fixed reference voltage, and the comparator, in the case of a change of sign of the comparison result, emits a logic "1" to the input of the OR-circuit FI, which input is associated with it. The sequence of such a "1" results in a logic "1" at the output of the OR-circuit FI. This circuit then transmits the latter to the set input S1 of a first static flip-flop FF1, particularly of a set-dominant RS-flip-flop whose information output Q1 directly serves the purpose of controlling an input associated with it of the output part PDM particularly designed in the form of an AND-circuit, i.e. of the pulse duration modulator.

The reset input R1 of the cited first flip-flop FF1, which already belongs to the actual oscillator FO, is controlled by the output of a comparator V1 which, in turn, is preferably designed in the form of an operational amplifier. The output of the comparator V1, moreover, controls the reset input R2 of a second static flip-flop FF2 (which is preferably a reset—dominant RS—flip-flop) whose information output Q2 is likewise provided for the purpose of controlling an additional input (associated with it) of the output circuit PDM of the control circuit RS. A comparator V2, similar to the first comparator V1, is connected with its output to the set input S2 of the second flip-flop FF2. The primary winding $W_p$ of the transformer Tr, or the supply potential $U_p$ of the primary side of the transformer Tr connected at its end not facing the switching transistor T, is connected via $R_A$ to one input each of the two comparators V1, V2 (in the illustrated exemplary case this is the inverting input of the respective comparator V1 or V2 designed in the form of an operational amplifier). The other input (in the exemplary case, the non-inverting input) of the two comparators V1 and V2 is connected to one reference potential $U_{B1}$ or $U_{B2}$ (relative to ground). The connecting element $R_A$ is a resistance.

An additional secondary winding $W_0$ of the transformer Tr of the logic system is connected to ground and also to the anode of a diode $D_B$ whose cathode is connected to ground via a capacitor $C_B$, and is also connected with the input of comparators V1 and V2.

In the case of the described embodiment, for the additionally provided oscillator FO, the operating voltage $U_B$ (which can also supply the remaining components of the control circuit RF) must be built-up via the dropping resistance $R_A$. When the combination logic system has started up, it must be maintained by means of the secondary winding $W_O$ and the diode $D_B$. The capacitor $C_B$ acts as a charging capacitor. The resistance $R_A$ thus acts as a starting resistance.

The actual oscillator FO consists of the two flip-flop cells FF1 (set-dominant) and FF2 (reset-dominant) and the two comparators V1 and V2. It blocks the effect of the control circuit RS via its output circuit PDM at the control electrode of the switching transistor T. It sets the error memory ($U_F$=H (=high)) provided by the first RS flip-flop FF1 and starts the "fly wheel-oscillator" of the normally active blocking oscillator converter controlling logic system through the positive edge of the signal $U_{st}$ which is provided by the Q-output of the second flip-flop cell FF2 (i.e. by Q2).

The error indicator FI constructed in the illustrated embodiment by an OR-circuit whose inputs represent a magnitude of the errors and whose output, together with the set input S1 of the first flip-flop FF1, sets the error memory FF1. In the set state of the first flip-flop FF1, there is thus always at least one operating error present in the blocking oscillator converter with controlling logic system or in its voltage supply.

In this state, the first flip-flop cell FF1 blocks the control of the switching transistor T by the control circuit RS. The logic system is switched off at the time 1 apparent from FIG. 5. Since no energy is supplied any longer via the winding $W_o$ and pn-diode DB, the operating voltage $U_B$ to be monitored by the two comparators V1 and V2 also decreases.

If the voltage $U_B$ has now dropped below the value of the reference voltage $U_{B1}$ connected to the first comparator V1, then the comparator V1 resets the second flip-flop FF2, and in case the set input S1 of the first flip-flop FF1 is at the level L (=low), it also resets the first flip-flop FF1. This behavior is shown in the time diagram in FIG. 5 by the time 2. On the basis of this resetting, the internal supply voltage $U_I$ for the stages of the control circuit RS is disconnected, so that the current consumption of the control circuit RS (current from $U_B$) drops to such an extent that the voltage $U_B$ through the current $\sim(U_P/R_A)$ can again rise ($U_p>U_B$).

If $U_B$ now attains the value of the voltage $U_{B2}$ (i.e. of the reference voltage at the second comparator indicated by the time 3 in the diagram according to FIG. 5), then the logic system is started as in the case of undisturbed operation. This is effected by the positive edge of the output voltage $U_{st}$ at the output Q2 of the flip-flop cell FF2. If an error message is then still present on the OR circuit FI, then the error memory FF1 again blocks the output PDM of the control circuit RS. The process is then constantly repeated in the case of presence of such an error message so that the switching transistor T remains permanently blocked.

If, however, by contrast the error is eliminated and an error-free state of the logic system and hence a zero error indication is achieved at the inputs of the error indicator FI, the logic system again starts in normal operation. This is indicated by time 6 in the diagram according to FIG. 5.

If, instead of the operational interferences on the primary side of the transformer Tr causing the previously described behavior of the circuit according to FIG. 4, an error may occur on the secondary side (e.g. through a short circuit in the secondary circuit containing the following load circuit RL to be supplied). The number of oscillations of the combinational logic system that will yet take place until the control of the switching transistor T is finally blocked by the control circuit RS depends upon the response time of error indicator FI. It is therefore advisable to adjust to a correspondingly small value the ratio of the interruption pulse delivered per time unit by the oscillator FO to the number of oscillations triggered in the same time and in the combinational logic system due to the effect of the control circuit RS. In accordance with experience, it is sufficient for this purpose that the frequency of the additional oscillator FO is adjusted to 100 Hz. By contrast, the frequency in the normal operation of the logic system due to the effect of the control circuit RS, amounts to e.g. 30 KHz.

Figure 4A:
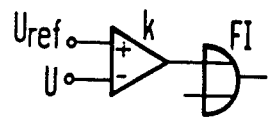
FIG. 4A and FIG. 4B illustrate a typical operating parameter control for an error indicator circuit of the logic system shown in FIG. 4.

In FIG. 4a, a simple possibility for providing an error signal to the error indicator FI is illustrated for the case in which the error source to be monitored is given by an operating voltage or a current. For this purpose, the voltage U, given by this error source, is compared in a comparator k with a fixed reference voltage $U_{ref}$, and the comparison result is supplied to one input of the error indicator FI.

Figure 4B:
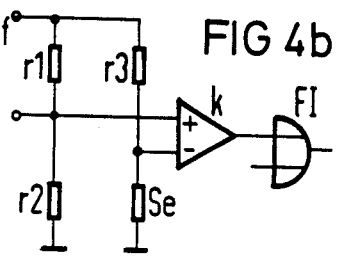

If an operating temperature is being monitored at a monitoring location of the logic system or of the circuit supplied by it, the temperature arising at the monitoring location is brought to act on a temperature-dependent resistance Se. As shown in FIG. 4b, the temperature sensor Se forms, together with a fixed resistor r3, a voltage divider connected to a reference voltage $U_{ref}$. The divider point of the voltage divider is connected to the one input of a comparator k. The other input of the comparator k is controlled by the divider point of a second voltage divider which is formed from the two fixed resistors r1 and r2 and which is likewise connected to the reference voltage $U_{ref}$. The input of the error indicator FI associated with the respective error source is controlled by the output of the comparator k, such as is apparent from FIG. 4b.

In the description of the action of the two flip-flop cells FF1 and FF2 provided in the oscillator FO, it has been stated above that due to the resetting of the first flip-flop FF1 (time 2 in the diagram according to FIG. 5) the internal supply voltage $U_I$ for the individual stages of the control circuit RS is disconnected. This occurs in the simplest fashion since, through the output Q2 of the second flip-flop cell FF2 (i.e. through the voltage $U_{st}$), a distributing board Sch is controlled which connects the supply connection carrying the voltage $U_I$ with the locations of the control circuit S to be supplied. The distributing board can e.g. be provided by a switching transistor corresponding to the transistor T. In any case, the distributing board Sch is designed in such a fashion that, in the case $U_{st}=H$ (=high), it releases the voltage $U_I$ for the supply of the control circuit RS and, in the case $U_{st}=L$ (=low), it blocks the supply of the control circuit RS.

The behavior of the two flip-flops FF1 and FF2 is jointly incorporated in the drawing according to FIG. 4.

It is advisable that the winding direction of the secondary winding $W_O$, provided for the purpose of supplying the two comparators V1 and V2 in the oscillator FO, has the same winding direction as the secondary winding $W_S$ provided for supplying the electronic apparatus $R_L$, because the secondary voltage $U_S$ can thus be directly controlled (over-voltage and under-voltage control).

Although various minor changes and modifications might be proposed by those skilled in the art, it will be understood that we wish to include within the claims of the patent warranted hereon all such changes and modifications as reasonably come within our contribution to the art.

We claim as our invention:

1. A blocking oscillator converter with controlling logic system for supplying an electrical apparatus, comprising:

a transformer whose primary winding is connected to a d.c. source and in series with a control path of a switching transistor;

a secondary winding of the transformer for connection to the electrical apparatus;

a control electrode of the switching transistor being controlled by an output of a switching control circuit;

said switching control circuit having modulation means for controlling the switching transistor;

an oscillator means emitting in its active state periodic interruption pulses to the modulation means, said modulation means blocking normal control of the switching transistor through each of said periodic interruption pulses;

said oscillator means identifying a potential danger to the converter through an input it receives related to operating parameters of the converter; and said oscillator means in the case of normal behavior of said parameters not influencing the switching transistor, and given an active state in which the potential danger is identified, the interruption pulses emitted by the oscillator to the modulation means, as well as a frequency of said interruption pulses, are matched to a time behavior of the control circuit in such a fashion that after each interruption pulse a reactivation of switching transistor control by the control circuit occurs in accordance with normal control circuit operation.

2. A blocking oscillator converter with controlling logic system according to claim 1 wherein the oscillator means input is provided by an error indicator means having a plurality of inputs associated with the operating parameters being monitored and having an output signal at a first logic level only in a case of normal behavior of all operating parameters and a second logic level in all other instances.

3. A blocking oscillator converter with controlling logic system according to claim 2 wherein the error indicator means comprises an OR circuit whose inputs are each respectively associated with one of the operating parameters to be monitored, and which inputs are loaded by a logic "1" in the case of abnormal behavior and by a logic "0" in the case of normal behavior of the respective operating parameter.

4. A blocking oscillator converter with controlling logic system according to claim 2 wherein an output of the error indicator means is connected to a set input of a first static flip-flop whose output is connected to a first input of the modulation means for blocking control of the switching transistor by the modulation means in the event of an error indication; the end of the primary winding of the transformer connecting to the d.c. source being connected via a first resistance to first inputs of first and second comparators whose second inputs are connected to respective first and second reference voltages, a capacitor connecting from the first inputs to ground; a cathode end of a diode connecting to the first inputs and its anode connecting to one end of another secondary winding of the transformer whose other end connects to ground; an output of the first comparator being connected to control a reset input of the first static flip-flop and also a reset input of a second static flip-flop; a set input of the second static flip-flop being connected to an output of the second comparator; an output of the second flip-flop being connected to a second input of the modulation means; said modulation means upon receiving information at said second input blocking control of the switching transistor; and power switching means connected to said second input for sensing signal states fed to the second input and switching supply voltage feed to the control circuit in phase with the signal states at the second input.

5. A blocking oscillator converter with controlling logic system according to claim 4 wherein signals fed to the first and second inputs of the modulation means are related to one another.

6. A blocking oscillator converter with controlling logic system according to claim 5 wherein the modulation means is controlled either by the oscillator means or other inputs from the converter.

7. A blocking oscillator converter with controlling logic system according to claim 1 wherein a ratio of a frequency of the oscillator means to a normal operating frequency of the converter is in a range of 1:10 to 1:1000.

8. A blocking oscillator converter with controlling logic system according to claim 1 wherein a winding direction of another secondary winding supplying comparators in the oscillator means is the same as a winding direction of the secondary winding of the transformer connecting to the electrical apparatus.

9. A blocking oscillator converter with controlling logic system for supplying an electrical apparatus, comprising:

a transformer having its primary connected at one end to a d.c. source and its other end connecting to a switching transistor;

a control circuit connecting to control the switching transistor and having a modulator means and associated circuit means connected to a feedback secondary winding of the transformer for permitting the blocking oscillator converter to oscillate such that the switching transistor periodically switches current in the primary of the transformer such that at a secondary thereof connected to a rectifier and the electrical apparatus a voltage is developed for the electrical apparatus;

oscillator means connected to the modulator means, and error indicator means connected to the oscillator means;

said error indicator means connecting to at least one parameter of the circuit indicating possible circuit danger during operation and providing a signal to the oscillator means when a danger condition exists;

when said danger condition exists said oscillator means providing periodic interruption pulses to the modulator means so that the control circuit no longer operates at its normal operating frequency but rather causes the switching transistor to operate at a frequency determined by the periodic interruption pulses of the oscillator means, a frequency of said periodic interruption pulses being substantially lower than the normal operating frequency of the converter; and the oscillator means after each periodic interruption pulse determining whether an error signal is still being received from the error indicator means and, if not, permitting the switching transistor to resume normal operation.

* * * * *